United States Patent
Zhou et al.

(10) Patent No.: US 12,339,116 B1
(45) Date of Patent: Jun. 24, 2025

(54) NON-CONTACT OPTICAL AXIS AND PUPIL CENTER DETECTION APPARATUS

(71) Applicant: MLOptic Corp, Redmond, WA (US)

(72) Inventors: Wei Zhou, Sammamish, WA (US); Dong Liu, Nanjing (CN); Michael Zhang, Los Altos, CA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 19/025,771

(22) Filed: Jan. 16, 2025

(51) Int. Cl.
*G01B 11/27* (2006.01)

(52) U.S. Cl.
CPC .................... *G01B 11/272* (2013.01)

(58) Field of Classification Search
CPC ....... G01B 11/24; G01B 11/27; G01B 11/255; G01B 11/272
USPC ......................... 356/400, 399, 401
See application file for complete search history.

(56) References Cited

U.S. PATENT DOCUMENTS

| | | | | |
|---|---|---|---|---|
| 5,633,716 A * | 5/1997 | Corby, Jr. | ............ | G01B 11/272 356/621 |
| 5,822,066 A * | 10/1998 | Jeong | ................. | G01B 9/02024 356/521 |
| 11,754,832 B1 * | 9/2023 | Wu | ..................... | G02B 27/1066 359/642 |
| 11,860,380 B1 * | 1/2024 | Zhou | ...................... | G02B 27/62 |
| 2008/0018896 A1 * | 1/2008 | Scott | ...................... | G02B 6/422 356/399 |
| 2010/0285400 A1 * | 11/2010 | Inada | ................. | G01B 9/02041 430/30 |
| 2013/0250284 A1 * | 9/2013 | Lienhart | ............. | G01B 11/272 356/138 |
| 2014/0268147 A1 * | 9/2014 | Glazowski | ........... | G02B 21/008 356/364 |
| 2021/0356591 A1 * | 11/2021 | Kato | ..................... | G01S 7/4814 |
| 2023/0098439 A1 * | 3/2023 | Darwin | ............. | G01B 9/02043 356/369 |
| 2023/0204351 A1 * | 6/2023 | Wu | ........................ | G01B 11/27 356/401 |

* cited by examiner

*Primary Examiner* — Isiaka O Akanbi
(74) *Attorney, Agent, or Firm* — Jong Patent Firm; Cheng Ning Jong; Tracy P. Jong

(57) ABSTRACT

An apparatus for indicating a misalignment of an optical axis of a lens system including a lens, a front end and a rear end, the lens having a front surface and a rear surface, the apparatus including a light source, a first mirror, a first beam splitter, and an image plane, wherein a laser beam of the light source is configured to be directed at the first beam splitter to result in a first and a second beam, the first beam is redirected at the first mirror before being redirected by the first mirror through the first beam splitter to cast a first spot at the image plane, and the second beam is disposed through the first beam splitter to be directed at the front surface of the lens system before being redirected by the first beam splitter to cast a second spot at the image plane.

11 Claims, 13 Drawing Sheets

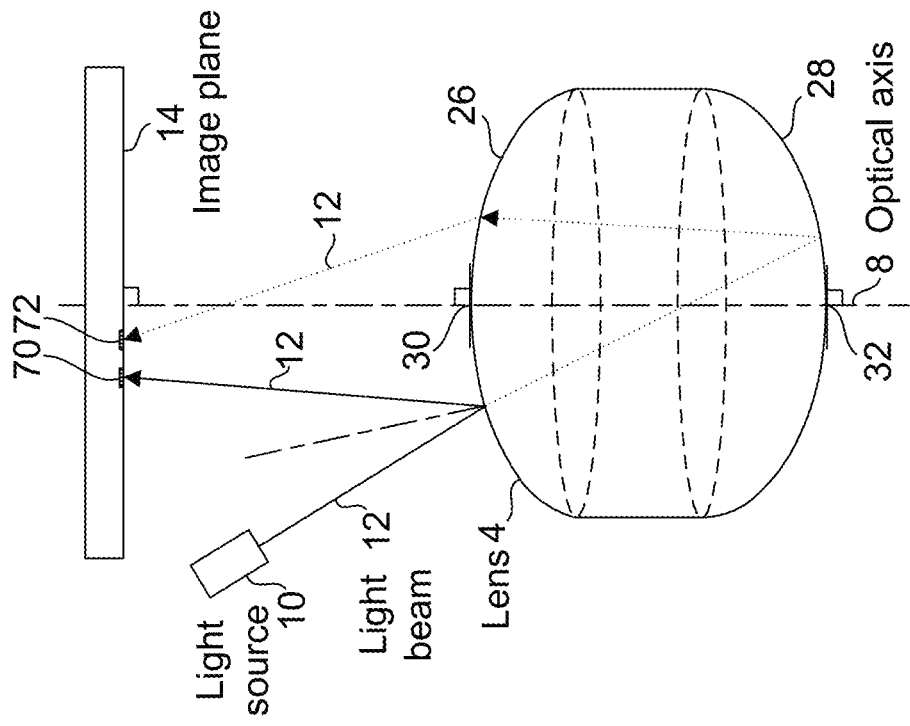
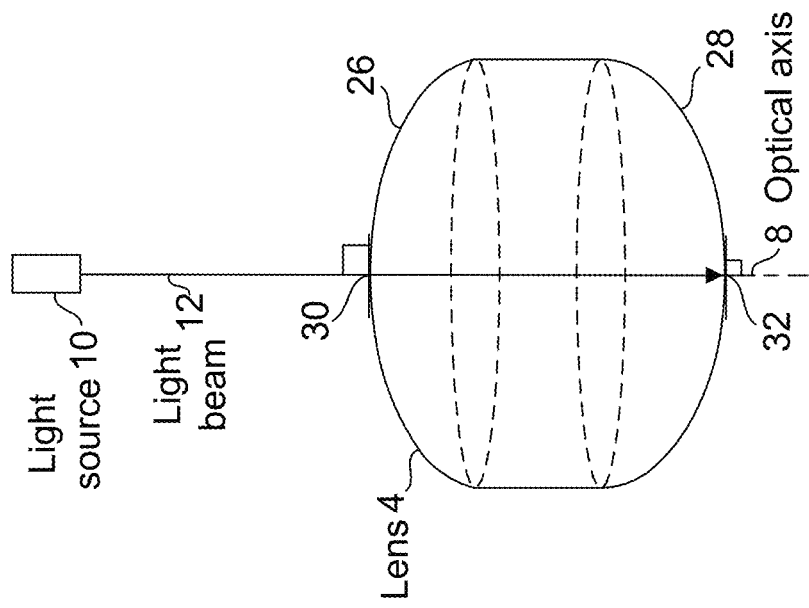

NON-CONTACT OPTICAL AXIS AND PUPIL CENTER DETECTION APPARATUS

BACKGROUND OF THE INVENTION

1. The Field of the Invention

The present invention relates to the field of optical detection systems, particularly those used for detecting the optical axis and pupil of a lens system. More specifically, the present invention is directed to a non-contact system for detecting the optical axis and pupil of a lens system.

2. Background Art

High-quality optical systems are critical in fields such as microscopy, photography, telecommunications, and advanced imaging, i.e., extended reality (XR) technologies. Lens systems, especially compound lens systems which each consist of multiple individual lenses, must be precisely aligned during manufacturing to ensure that they share a common optical axis and achieve optimal performance. Misalignments can cause aberrations, reduce imaging quality, and degrade the overall functionality of the optical system. In the manufacture or assembly of high-quality compound lens systems, the lenses must be aligned relative to one another with high accuracy to result in a common optical axis shared by all of the lens of the compound lens system. For a single-lens lens system, it is also critical to identify the optical axis of a lens system such that it can be precisely aligned with its environmental element/s in an application the lens system is designed for.

Existing alignment technologies, such as those disclosed in U.S. Pat. No. 9,766,155 to Oya et al. (hereinafter Oya), use methods to measure the positions of centers of curvature of optical surfaces within a lens system. Oya's approach involves an imaging lens system that simultaneously captures an object plane into two image planes, allowing for the calculation of the centers of curvature of lens surfaces. These positions are detected using reflections of measuring light by spatially resolving light sensors. While Oya's methods offer solutions for measuring curvature centers of symmetrical lenses, it has significant limitations. For asymmetrical lens systems, Oya's method does not effectively address optical systems containing lenses that are asymmetrical about their optical axes. This restricts its applicability to a subset of optical systems. Oya's approach relies on pre-calculated data for lens alignment rather than providing real-time feedback during the alignment process. As a result, errors introduced during assembly may remain undetected until the system is fully constructed and tested. Oya's methods lack the capability to verify the alignment of multiple lenses as an integrated optical system under operational conditions. These limitations highlight the need for a more robust solution that can accurately and non-invasively detect the optical axis and pupil of a compound lens system, including asymmetrical designs, while enabling real-time alignment and system-level verification.

There exists a need for an apparatus or system capable of detecting the optical axis and pupil center of a lens system regardless of the types of the lens system, providing real-time feedback during the alignment or detection process to enhance precision and reduce errors, verifying alignment of the compound lens system as a whole under real-world operating conditions, eliminating the need for contact-based methods utilizing, e.g., one or more mechanical datums, e.g., front plate of a lens system or an outer surface of barrel within which one or more lenses are mounted. The present invention fulfills this need by introducing a non-contact detection system for the optical axis and pupil center of a lens system. This apparatus ensures high precision and reliability, thereby improving the assembly and integration of lens systems, e.g., compound lens systems, into advanced optical devices.

SUMMARY OF THE INVENTION

In accordance with the present invention, there is provided an apparatus for indicating a misalignment of an optical axis of a lens system having at least one lens, a front end and a rear end, the at least one lens having a front surface and a rear surface, the apparatus including:
(a) a light source;
(b) a first mirror;
(c) a first beam splitter; and
(d) an image plane,
wherein a laser beam of the light source is configured to be directed at the first beam splitter to result in a first beam and a second beam, the first beam is redirected at the first mirror before being redirected by the first mirror through the first beam splitter to cast a first spot at the image plane, and the second beam is disposed through the first beam splitter to be directed at the front surface of the lens system before being reflected back by the lens system and redirected by the first beam splitter to cast at least one second spot at the image plane, if the at least one second spot does not coincide with the first spot, a misalignment of an optical axis of the lens system with the laser beam is said to have occurred.

In accordance with the present invention, there is further provided an apparatus for detecting an optical axis of a lens system, the lens system having at least one lens, a front end and a rear end, the at least one lens having a front surface and a rear surface, the apparatus including:
(a) a light source;
(b) a first mirror;
(c) a first beam splitter;
(d) a second beam splitter configured to be disposed between the light source and the lens system;
(e) an image plane; and
(f) a motion stage configured for receiving the lens system,
wherein a laser beam of the light source is configured to be directed at the first beam splitter to result in a first beam and a second beam, the first beam is redirected at the first mirror before being redirected by the first mirror through the first beam splitter to cast a first spot at the image plane, and the second beam is disposed through the first beam splitter to be directed at the front surface of the lens system before being reflected back by the lens system and redirected by the first beam splitter to cast at least one second spot at the image plane, if the at least one second spot does not coincide with the first spot, a misalignment of an optical axis of the lens system with the laser beam is said to have occurred and at least one of a positional and an orientational adjustment of the lens system is made to dispose the lens system in a position and an orientation such that the second spot is coincidental with the first spot.

In accordance with the present invention, there is further an apparatus for detecting an optical axis and a pupil center of a lens system, the lens system having at least one lens, a front end and a rear end, the at least one lens having a front surface and a rear surface, the apparatus comprising:
(a) a light source;
(b) a first mirror;

(c) a first beam splitter;
(d) a second beam splitter configured to be disposed between the light source and the lens system;
(e) a distance sensor configured to communicate sensing signals between the distance sensor and the first lens of the at least one lens through the second beam splitter and the first beam splitter;
(f) an image plane; and
(g) a motion stage configured for receiving the lens system, wherein a laser beam of the light source is configured to be directed at the first beam splitter to result in a first beam and a second beam, the first beam is redirected at the first mirror before being redirected by the first mirror through the first beam splitter to cast a first spot at the image plane, and the second beam is disposed through the first beam splitter to be directed at the front surface of the lens system before being reflected back by the lens system and redirected by the first beam splitter to cast at least one second spot at the image plane, if the at least one second spot does not coincide with the first spot, a misalignment of an optical axis of the lens system with the laser beam is said to have occurred and at least one of a positional and an orientational adjustment of the lens system is made to dispose the lens system in a position and an orientation such that the second spot is coincidental with the first spot and the distance sensor returns a distance to the first lens of the at least one lens, indicating the location of the pupil center.

In one embodiment, at least one of the at least one lens of the lens system is a lens with an anti-reflective coating disposed on the front surface of the at least one lens and the light source is an 800-MHz laser beam light source to allow the at least one second spot to be cast on the image plane. In one embodiment, the apparatus further includes a second mirror disposed at the rear end of the lens system, the second mirror configured to reflect remnants of the second beam exiting the rear end of the lens system back into the lens system before being redirected by the first beam splitter to form a part of the at least one second spot. In one embodiment, the image plane is an image plane of an image sensor. In one embodiment, the at least one lens of the lens system is at least two lenses. In one embodiment, the motion stage is configured to be rotatable about an axis parallel to the laser beam. The distance sensor can be a depth sensor or a confocal sensor.

An object of the present invention is to provide an apparatus and a method for determining whether the optical axis of a lens system has been detected.

Another object of the present invention is to provide an apparatus and a method for detecting the optical axis of a lens system once it has been determined that the optical axis of the lens system has not been detected.

Another object of the present invention is to provide an apparatus and a method for detecting the optical axis of a lens system without relying on one or more mechanical datums.

Another object of the present invention is to provide an apparatus and a method for detecting the optical axis of a lens system with a non-contact solution.

Another object of the present invention is to provide an apparatus and a method for locating the pupil center of a lens system.

Another object of the present invention is to provide an apparatus and a method for detecting the optical axis in a manner which does not rely on intermediate results where errors may be introduced.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a diagram depicting the definition of an optical axis through a lens;

FIG. 2 is a diagram demonstrating an effect of directing a light beam at a lens along a path outside of its optical axis;

PARTS LIST

Figure 3:
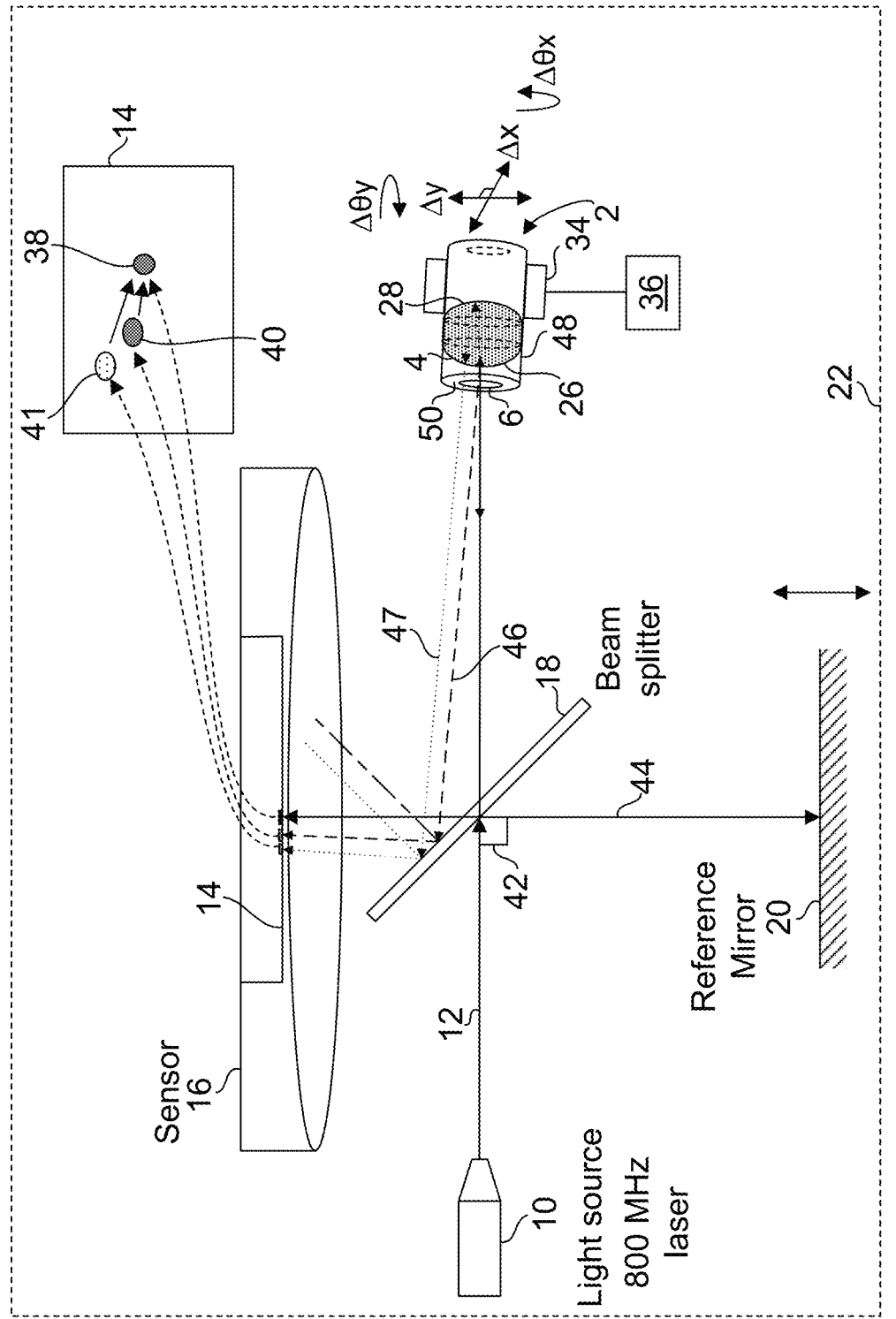
FIG. 3 is a diagram depicting an apparatus for detecting an optical axis of a lens system having a single lens, wherein the optical axis of the lens system has not been detected.

2—lens system
4—lens
6—pupil
8—optical axis
10—light source
12—light beam
14—image plane
16—image sensor, e.g., camera
18—beam splitter
20—mirror
22—apparatus for indicating optical axis of lens system and allowing discovery of the optical axis of the lens system
24—mirror
26—front surface of lens
28—rear surface of lens
30—spot at which light beam is tangent to front surface of lens
32—spot at which light beam is tangent to rear surface of lens
34—motion stage, e.g., motion stage with at least four degrees of freedom (DOF)
36—motion stage controller
38—reference spot
40—prominent return spot
41—weak return spot
42—angle between reference light beam from light source and light beam received at image plane or sensor
44—reference light beam
46—return light beam due to primary reflection
47—return light beam due to secondary reflection
48—barrel of lens system
50—front plate of lens system
52—rotation of lens system about central axis of light beam of light source
54—controller
56—possible images cast at image plane of image sensor for higher optical power lens
58—possible images cast at image plane of image sensor for lens with lower optical power
60—depth sensor or confocal sensor
62—beam splitter
64—distance between distance sensor and light beam
66—distance between beam splitter and pupil center
68—pupil center
70—spot cast by reflection from front surface of lens or prominent return spot
72—spot cast by reflection from rear surface of lens or weak return spot
74—rear end of lens system
76—radius of curvature

PARTICULAR ADVANTAGES OF THE INVENTION

In a complex optical system composed of various lens systems, the proper functioning of the optical system depends on the fidelity of each lens system. While optical systems are designed to function correctly, errors in manufacturing may compromise their performance. One of the most important aspects of the performance of any optical system lies in the alignment of the optical axes of lens systems. Further, one or more lenses of a lens system may not be installed correctly with respect to their securing structures, e.g., a barrel and a front plate and the typical mechanical datums, e.g., the front plate or barrel surface/s of a lens system may not serve as reliable baselines for the alignment of other or adjacent lens systems. In one aspect, the present apparatus serves as an independent verification tool to determine whether a lens system has been manufactured correctly by pointing out that the optical axis cannot be found after many attempts. In another aspect, the present apparatus serves as a tool to identify the true optical axis of a lens system, especially one including more than one lens.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

FIG. 1 is a diagram depicting the definition of an optical axis 8 through a lens 4. It shall be noted that the optical axis 8 represents a path through the lens 4 where incident light rays through a first spot or point 30, are disposed at a right angle with respect to a plane tangential to the front surface 26 and the light rays continue through a second spot or point 32 disposed at a right angle with respect to a plane tangential to the rear surface 28, without being bent. Light rays not coincidental with the optical axis 8 can be reflected by the front surface as shown in FIG. 2. FIG. 2 is a diagram demonstrating an effect of directing a light beam at a lens 4 along a path outside of its optical axis. It shall be noted that when a light beam is directed at a lens in a path not coincidental with the optical axis of the lens 4, there is a light beam formed due to a reflection by the front surface 26 of the lens 4, or a primary reflection, and a light beam formed due to the reflection by the rear surface 28 of the lens 4, or a secondary reflection. Such reflected light beams can be demonstrated on an image plane 14 disposed in a manner to receive the reflected beams. The intensity of the spots shall vary from one lens system to another lens system as the spots are formed as a result of different reflected beams which traversed different paths in different lens systems. If there are subsequent surfaces, e.g., those of additional lenses, below the lens 4 for reflecting the light beam 12, there could be additional reflected light rays. As used throughout herein, a secondary reflection can mean any reflection, except the reflection by the front surface of the first lens. However, for simplicity, it is Applicant's intention to demonstrate the use of an image plane 14 disposed in a plane perpendicular to the optical axis 8 of the lens 4 shown in FIG. 2, to capture evidence of the non-alignment of a light beam with the optical axis of a lens, i.e., the existence of reflected beams outside of the optical axis 8. Spot 70 that is cast by a reflection from the front surface 26 of lens 4 should appear brighter, i.e., at a higher intensity than spot 72 that is cast by a reflection from the rear surface 28 of lens 4. Therefore, spot 70 will appear as a more prominent spot than spot 72. It shall be noted then that if a light beam had been aligned with the optical axis 8, no reflected beams that are non-coincidental with the optical axis 8 would be formed. A present apparatus 22 for detecting the optical axis of a lens 4 or a lens system 2 is shown in the ensuing figures.

Figure 4:
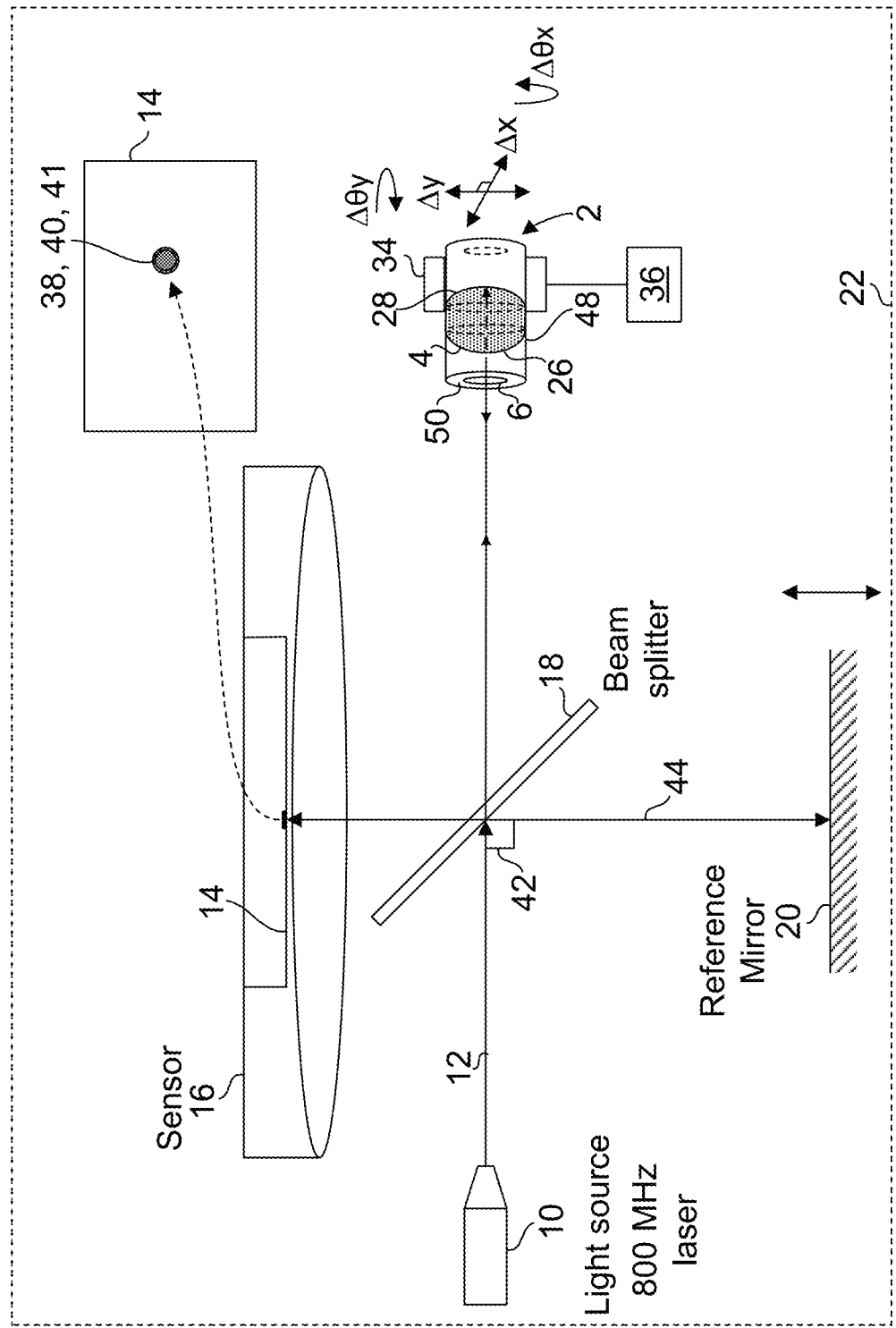
FIG. 4 is a diagram depicting the apparatus shown in FIG. 3 with the optical axis of the lens system having been detected.

FIG. 3 is a diagram depicting an apparatus 22 for detecting an optical axis 8 of a lens system 2 having a single lens 4 disposed in a barrel 48 having a pupil 6 disposed at a front plate 50, wherein the optical axis of the lens system has not been detected. Upon setting up apparatus 22 to receive the lens system 2 at the motion stage 34, the light source 10 is first turned on to indicate the status of detection of the optical axis. The image received at an image plane 14, e.g., of an image sensor or camera 16, indicates a misalignment of the optical axis of the lens system 2 and light beam 12. Adjustments on the position and/or orientation of the lens system 2 would be required to get light beam 12 to be coincidental with the optical axis of the lens system 2. As shown herein, the lens system 2 includes a front end, a rear end and only one lens 4. The lens 4 includes a front surface 26 and a rear surface 28. In reality, each surface 26, 28 of a lens can be a concave surface or a convex surface. The apparatus 22 includes a light source 10, a first or reference mirror 20, a first beam splitter 18 and an image plane 14. In a preferred embodiment, the light source 10 is configured to emit a laser beam 12 directed at the first beam splitter 18 to result in a first beam and a second beam. The first beam is redirected at the first mirror 20 before being redirected by the first mirror 20 as reference light beam 44 through the first beam splitter 18 to be cast as a first spot 38 at the image plane 14 as a reference spot. This reference spot shall remain stationary as the device of the system that is configured to be adjusted, e.g., the motion stage 34, does not affect the establishment of this reference spot 38. It shall be noted that the angle 42 between reference light beam 12 from light source 10 and light beam received at image plane 14 or sensor 16 is a right angle. The second beam is disposed through the first beam splitter 18 to be directed at the front surface 26 of the lens system before being reflected back by the lens 4 of the lens system 2 as a return light beam 46 and a return light beam 47 and both are redirected by the first beam splitter 18 to be cast as a second spot 40 and a second spot 41, respectively, at the image plane 14. Note the oval shape of spots 40 and 41, compared to the circular shape of spot 38 as spots 40 and 41 are produced as reflected light beams traverse surfaces that are not normal to the reflected light beams. Spot 40 represents a spot cast by a reflection from the front surface of the first or front lens 4 of the lens system 2. Spot 41 represents a spot cast by a reflection from other surface/s of the first lens 4 or other subsequent lens/lenses of the lens system 2. Depending on the intensity of return spot 41, it may or may not appear prominently on the image plane 14. It shall be noted that as there is at least one spot 40, 41 formed on image plane 14, the light beam 12 is considered not aligned with the optical axis of the lens system 2 and that adjustments are necessary to bring light beam 12 in line with the optical axis of the lens system 2. For the purpose of making adjustments and verifying results of such adjustments to detect the optical axis of the lens system 2, it is imperative to rely on a more prominently-displayed spot, i.e., spot 40 to ensure that a successful alignment of light beam 12 and the optical axis can be achieved and that the lack of spot 41 is not treated as a successful alignment having been made. Therefore, before an adjustment is made, spot 40 is first identified. Spot 40 can be identified by recognizing that it is one of the spots with the highest intensity, with spot 38 having the highest intensity followed by spot 40. Upon positional and/or orientational adjustments of the lens system as described elsewhere herein, all previously prominent and non-prominent spots 38, 40, 41 will appear as a single overlapped spot as shown in FIG. 4. As some lenses are surface coated with anti-reflective coatings, it may be important in such cases to ensure that an appropriate light source 10 is used to generate spots with sufficient intensity. An 800-MHz laser beam light source has been found to allow light spots with sufficient intensity to be cast on the image plane 14.

Figure 5:
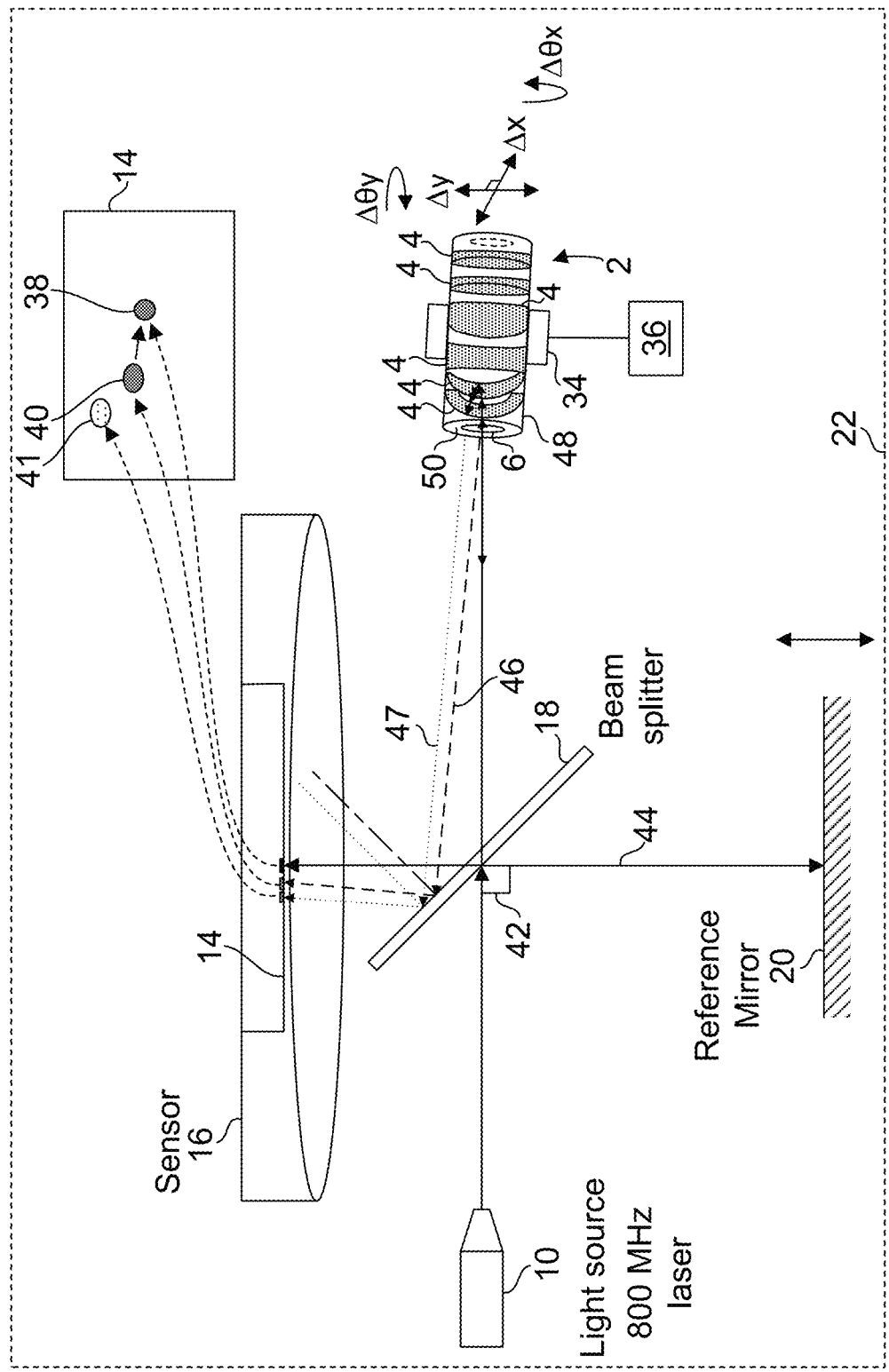
FIG. 5 is a diagram depicting an apparatus for detecting an optical axis of a lens system having a compound lens, wherein the optical axis of the lens system has not been detected.
Figure 6:
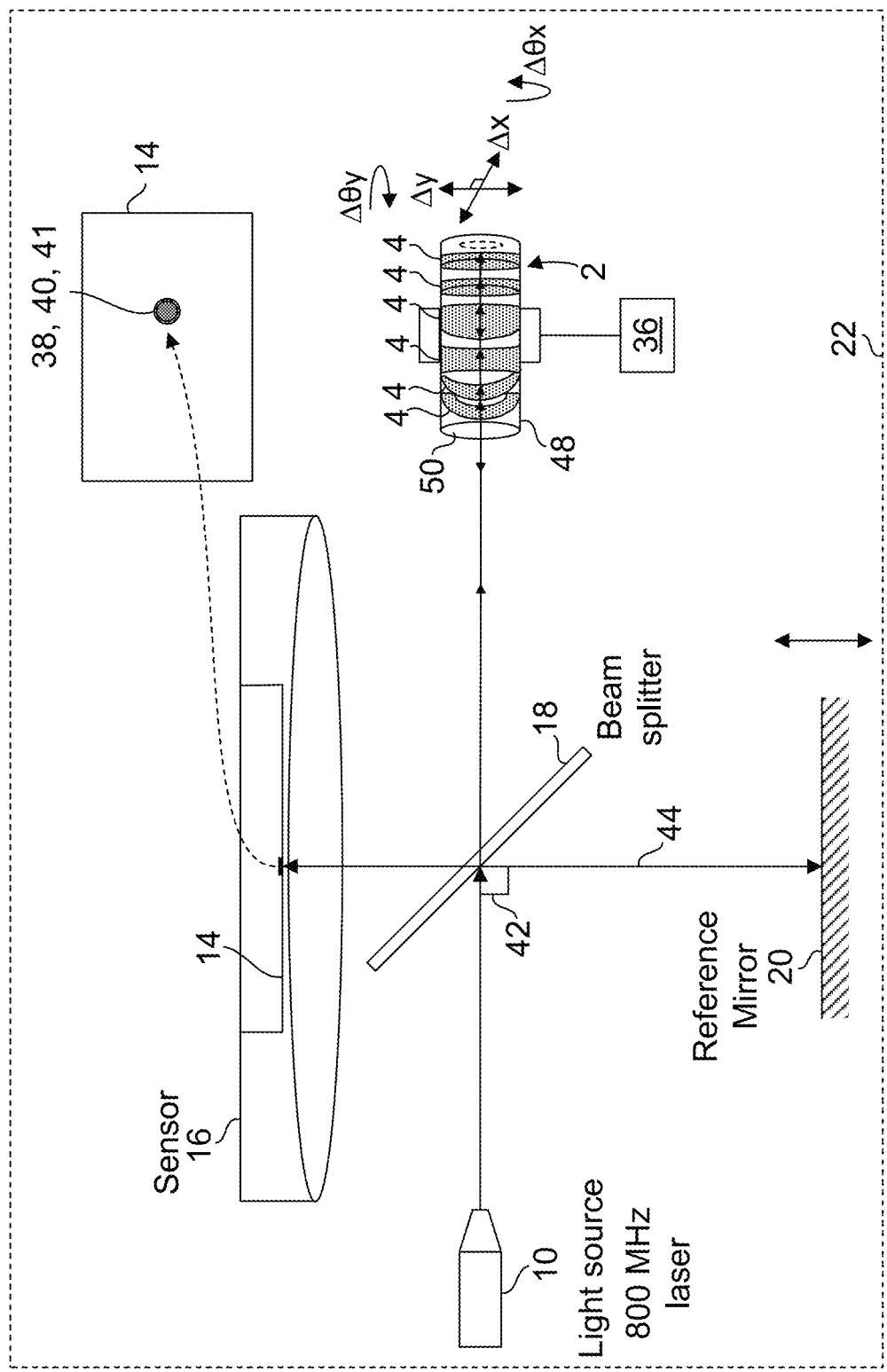
FIG. 6 is a diagram depicting the apparatus shown in FIG. 5 with the optical axis of the lens system having been detected.

Disclosed in FIGS. 3-4 is a lens system having a single lens. However, for many applications, e.g., those found in field of extended reality (XR), each lens system can have more than one lens, and often numerous lenses, making the lens system a compound lens system. FIG. 5 is a diagram depicting an apparatus for detecting an optical axis of a lens system 2 having a compound lens, wherein the optical axis of the lens system has not been detected. If the lens system has been properly constructed, i.e., with the optical axis of each lens concentrically disposed relative to all other optical axes, upon positional and/or orientational adjustments of the lens system as described elsewhere herein, all previously prominent and non-prominent spots 38, 40, 41 will appear as a single overlapped spot as shown in FIG. 6. Although the process of detecting the optical axis of the compound lens system 2 shown herein is the same as the process of detecting the optical axis on a single-lens system, it may be impossible to identify an optical axis of the compound lens system if the lens system has been fabricated with defects, e.g., when one or more of lenses of the lens system have been disposed with their optical axes out of alignment with the rest of the lenses in the lens system. However, in such a case, the present apparatus 22 remains useful for identifying a fabrication defect with the lens system.

Figure 7:
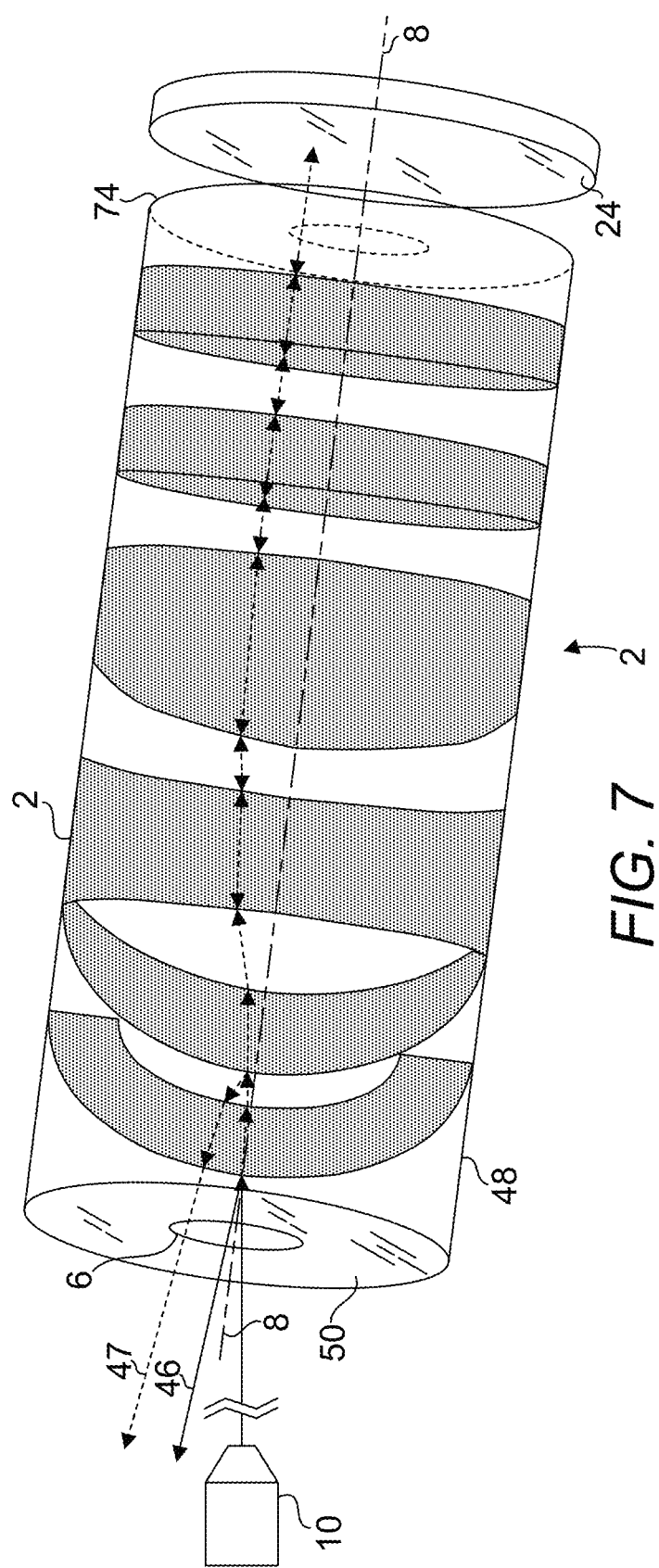
FIG. 7 is a close-up view of a lens system, depicting a manner in which secondary reflections within a lens system with a compound lens can be more clearly cast at an image plane.
Figure 8:
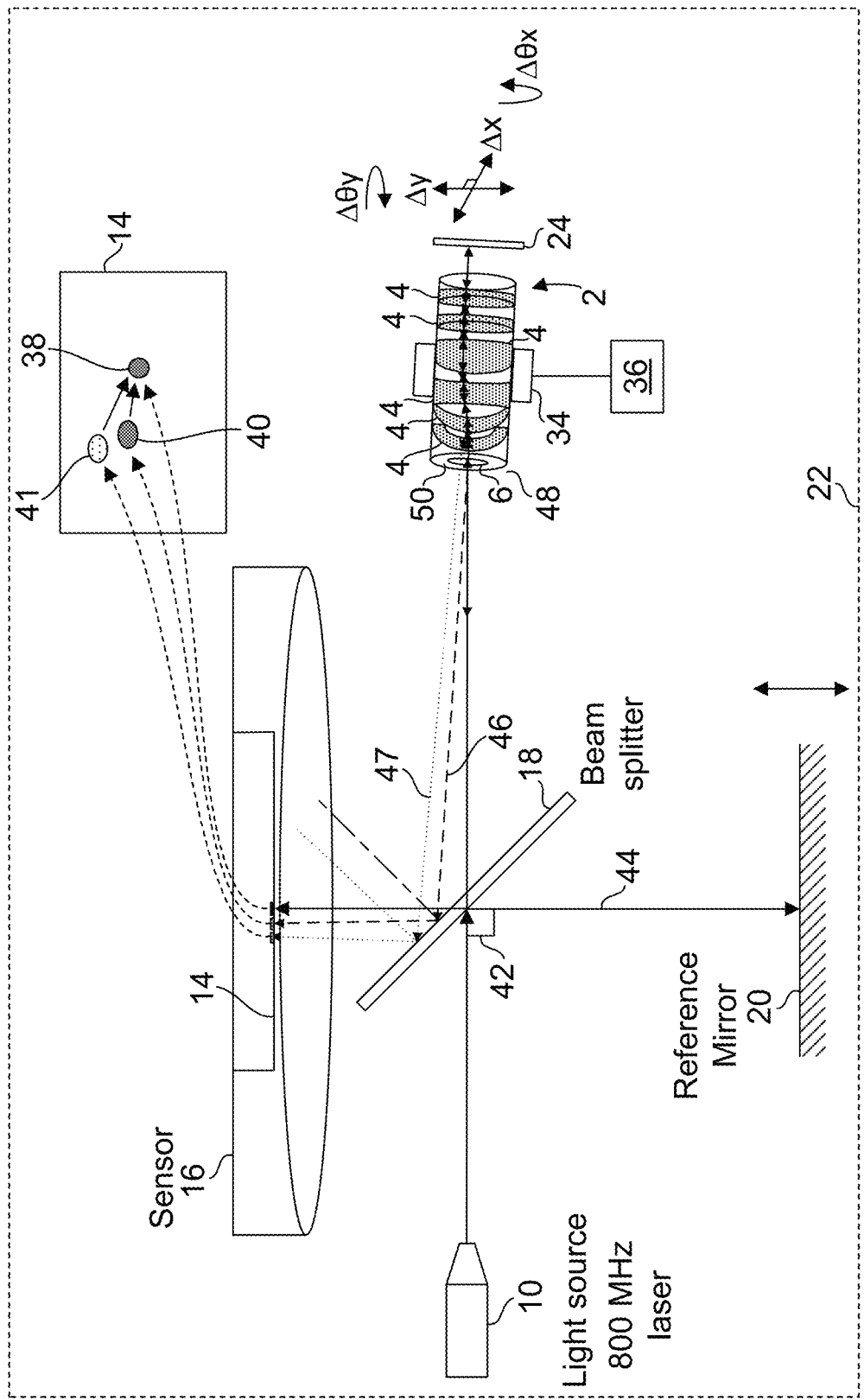
FIG. 8 is a diagram depicting an apparatus for detecting an optical axis of a lens system having a compound lens, wherein the optical axis of the lens system has not been detected.
Figure 9:
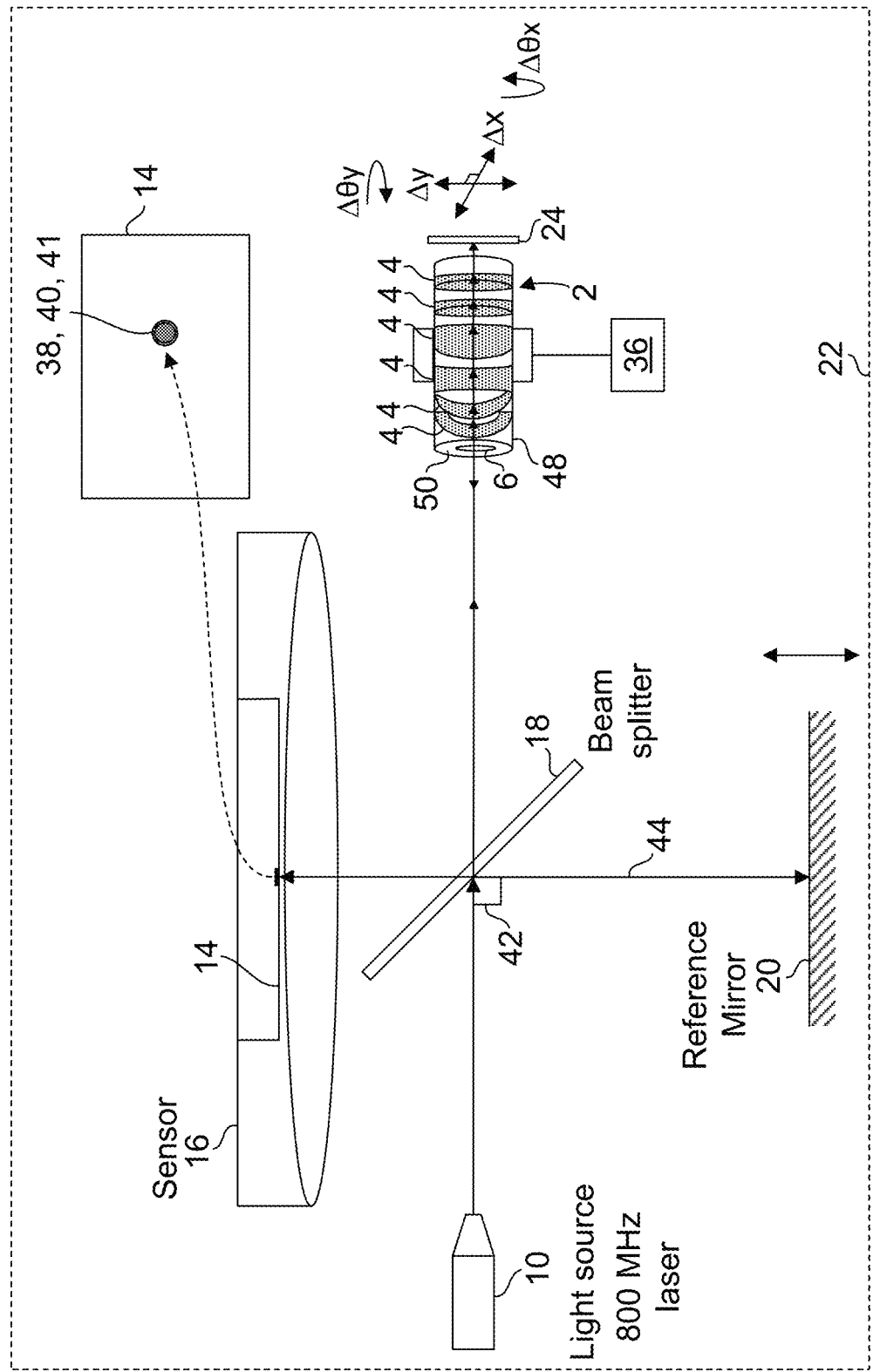
FIG. 9 is a diagram depicting the apparatus shown in FIG. 8 with the optical axis of the lens system having been detected.

FIG. 7 is a close-up view of a lens system, depicting a manner in which secondary reflections within a lens system with a compound lens can be more clearly cast at an image plane. In cases where the detection and confirmation of the optical axis through the entirety of a lens system is desired, a second mirror 24 may be disposed on the rear end of the lens system to bolster the reflected light beam 47 through the entirety of the lens system 2. FIG. 8 is a diagram depicting an apparatus for detecting an optical axis of a lens system having a compound lens, wherein the concept shown in FIG. 7 has been incorporated and the optical axis of the lens system has not been detected. The second mirror 24 is configured to reflect remnants of the second beam exiting the rear end 74 of the lens system back into the lens system 2 before being redirected by the first beam splitter 18 to form spot 41. Upon positional and/or orientational adjustments of the lens system as described elsewhere herein, all previously prominent and non-prominent spots 38, 40, 41 will appear as a single overlapped spot as shown in FIG. 9.

Figure 10:
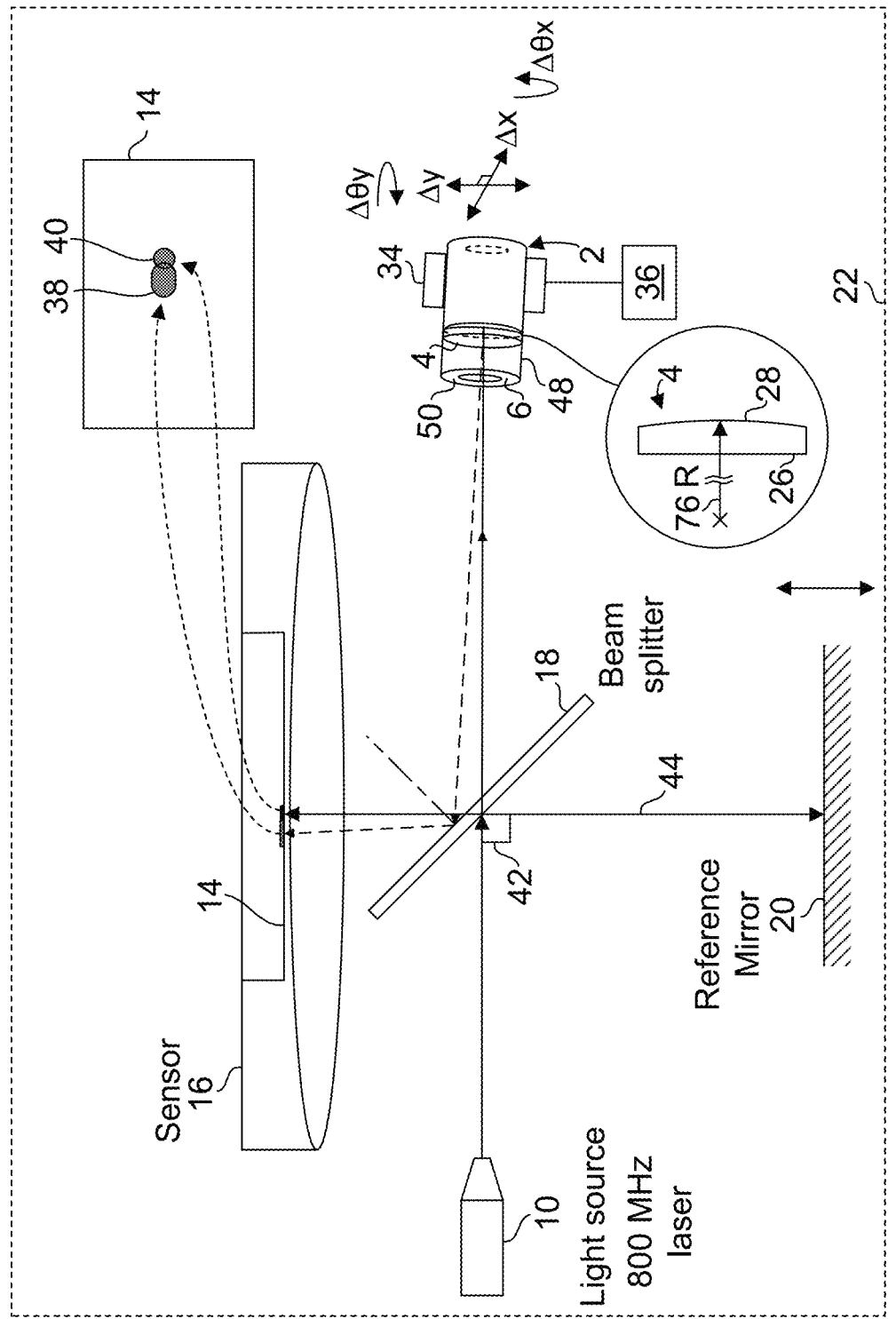
FIG. 10 is a diagram depicting an apparatus for detecting an optical axis of a lens system having a lens with lower optical power, wherein the optical axis of the lens system has not been detected.
Figure 11:
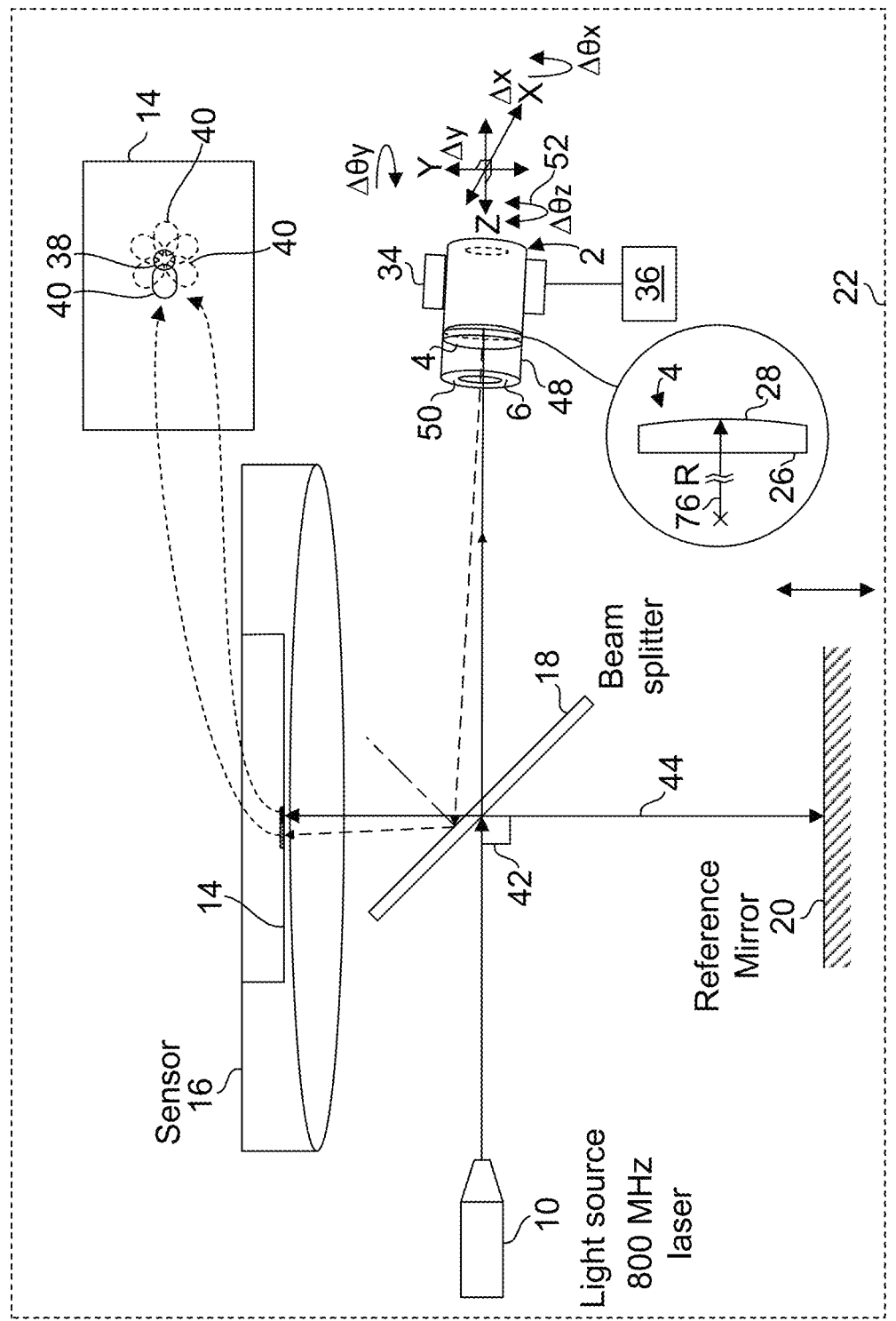
FIG. 11 is a diagram depicting the apparatus shown in FIG. 10, wherein a deviation of the optical axis of the lens system from the light beam of the light source is being confirmed and demonstrated.
Figure 12:
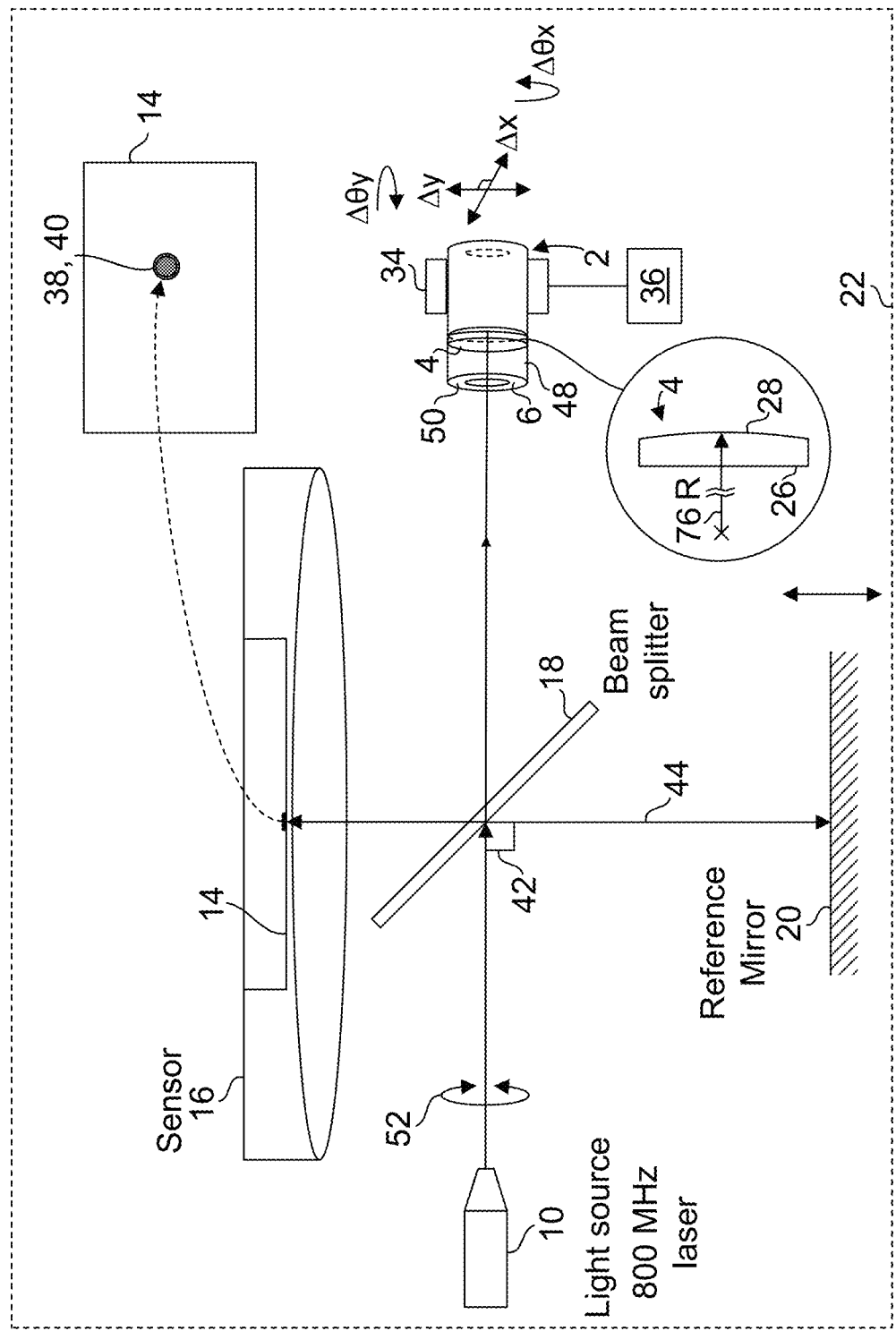
FIG. 12 is a diagram depicting the apparatus shown in FIG. 10 with the optical axis of the lens system having been detected.

FIG. 10 is a diagram depicting an apparatus for detecting an optical axis of a lens system 2 having a lens with lower optical power, wherein the optical axis of the lens system has not been detected. A lens with lower optical power generally has a flatter surface, i.e., a surface with a larger radius of curvature 76, may present some challenges for its optical axis to be identified especially when light beam 12 is only slightly deviated from the optical axis 8 to result in a spot 40 that does not appear separately from spot 38 or the reference spot. A spot due to secondary reflections may complicate the detection of a lens with lower optical power further and for the sake of simplicity, such a spot is not shown in FIGS. 10 and 11. It shall be noted that as surface 26 is flat and surface 28 is nearly flat, it may be challenging to discern the type of adjustment, e.g., whether a positional and/or orientational adjustment is required or the magnitude of such a positional and/or orientational adjustment. Although spots 38 and 40 appear connected, they are not concentric. Therefore, in order to distinguish spot 38 from spot 40, a technique is introduced elsewhere herein to more clearly delineate the outlines of the two spots 38, 40 such that adjustments can be made or the effectiveness of such adjustments be ascertained so that the optical axis of the lens system can be identified. FIG. 11 is a diagram depicting the apparatus shown in FIG. 10, wherein a deviation of the optical axis of the lens system from the light beam 12 of the light source 10 is being confirmed and demonstrated. Here, the motion stage 34 is shown to possess a degree of freedom (DOF) which allows the lens system 2 to be rotatable according to a rotation 52 about an axis, e.g., Z-axis, that is coincidental with the laser beam 12. Note that the image on the image plane 14 that shows spot 40 tracing a circular pattern can be obtained, confirming the existence of a circular spot, i.e., spot 38 and an oval spot, i.e., spot 40 that revolves around spot 38. Upon positional and/or orientational adjustments of the lens system as described elsewhere herein, all previously prominent and non-prominent spots 38, 40 will appear as a single overlapped spot as shown in FIG. 12.

Figure 13:
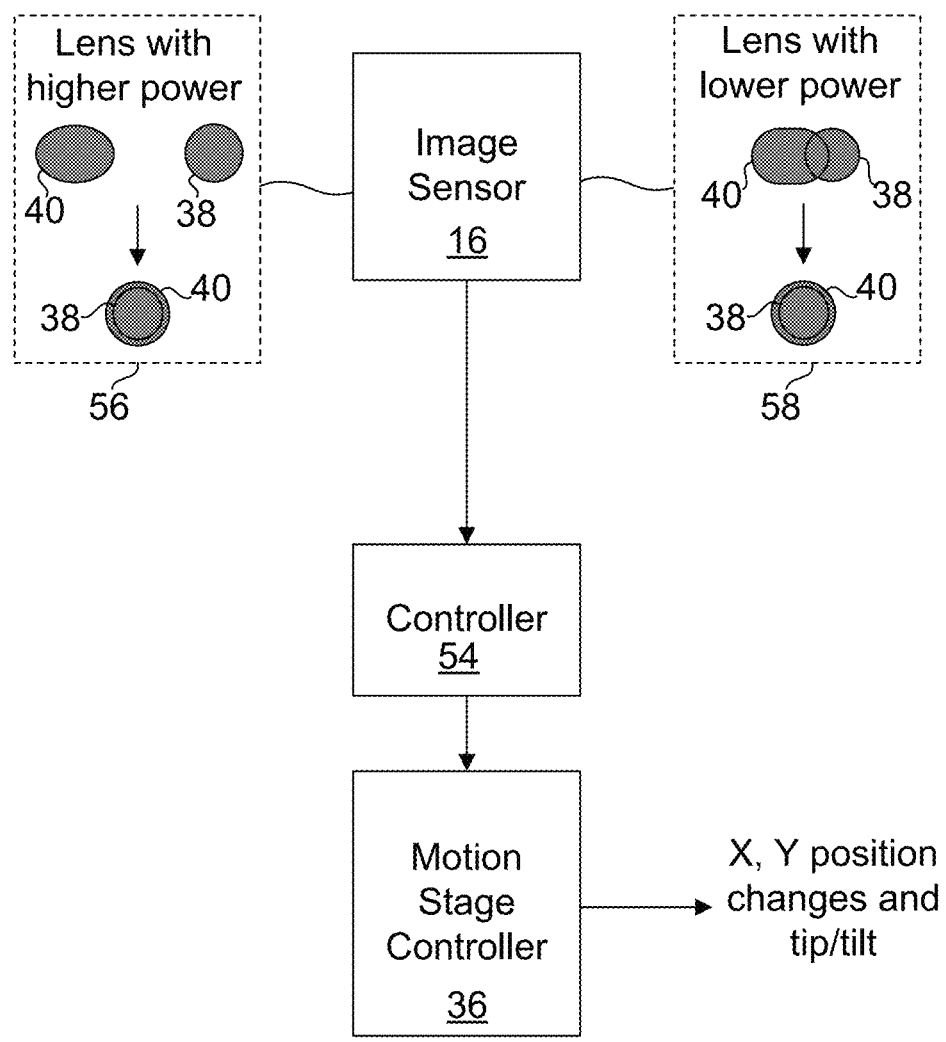
FIG. 13 is a diagram depicting a present controller configured to receive and process inputs from the image sensor and output control signals to a motion stage controller which in turn controls a motion stage, based on the inputs from the image sensor.

FIG. 13 is a diagram depicting a present controller 54 configured to receive and process inputs from the image sensor 16 and output control signals to a motion stage controller which in turn controls a motion stage, e.g., a motion stage with at least four degrees of freedom (DOF), based on the inputs from the image sensor 16. In detecting the optical axis of a lens system, the lens system is first arranged with its pupil exposed and pointed at the light beam 12 emanating from the light source 10 to penetrate a location as close to the pupil center of the lens system. As used herein, a pupil center of the lens system refers to the geometric center of the entrance pupil of the lens system. As shown elsewhere herein, if at least two spots 38, 40 are detected on the image plane 14 of the image sensor 16, it is an indication that the light beam 12 emanating from the light source 10 has not been aligned with the optical axis of the lens system. In order to correct the alignment of the light beam 12 with the optical axis of the lens system 2, a controller 54 is configured to make positional and/or angular adjustments of the light source 10 relative to the lens system. Positional adjustments in the X or Y direction or translation along these two axes and angular adjustments about the X and Y axes are made with a motion stage 34 within which the lens system 2 is mounted. The motion stage 34 is configured to be controlled using a motion stage controller 36 which provides precise positional and angular control of lens system 2 upon receiving commands to do so. Another controller 54 is functionally connected to both the image sensor 16 and the motion stage controller 36. This controller 54 is configured to receive inputs from the image sensor 16, determine whether an alignment correction is necessary and send appropriate commands to the motion stage controller 36 to adjust the position and/or orientation of the lens system such that the optical axis can be located. As shown elsewhere herein, it is possible for the image sensor 16 to receive the two types of images depending on whether the first lens of the lens system is a high or low optical power lens. A higher optical power lens generally has at least a surface that is more severely-curved with a smaller effective focal length (EFL) and a smaller radius of curvature 76 than a lower optical power lens and may result in test images 56 shown on the left side of the block representing an image sensor 16 in FIG. 13 while those images 58 of the lower optical power lens are shown on the right side. The location of the light source and the position of the light beam 12 emanating from the light source 10 are known locations relative to the position and orientation of the motion stage 34. For a lens system having a well-formed barrel mounted on the motion stage, although the process of detecting the optical axis and pupil center may start with pointing the light beam 12 at a center portion of the entrance pupil 6 of the lens system with the light beam 12 disposed parallel to an outer surface of the barrel 48, it is highly likely that the returned image captured by the image sensor 16 would still indicate that the light beam 12 is not aligned with the optical axis of the lens system, i.e., the return spot 40 does not appear to be coincidental with the reference spot 38. In the embodiment shown, the cast spots 38, 40 are circular or oval-shaped cast spots. Cast images of other shapes may be used, e.g., those of a cross or other shapes from which the orientations of the cast spots can be distinguished to ensure that completion of an optical axis detection process can be easily discerned. The optical axis of the lens system can be said to have been identified when the cast spots 38, 40 overlap one another. The detection of the optical axis may be accomplished manually or automatically. In a manual process, the position of the lens system in an X-Y plane or the tip/tilt angles or angles of the lens system about the X-axis and the Y-axis may be adjusted manually while the lens system is mounted on the motion stage until the cast spots 38, 40 of reticles are observed to overlap one another. In an automated process, a test image as shown in test images 56 and 58 is first processed for determining the concentricity of two spots 38, 40 using, e.g., feature detection techniques. If the spots 38, 40 are deemed to be cast at two different locations, the position and/or orientation of the lens system may be adjusted using the motion stage 34 controllable with the motion stage controller 36, through an iterative process, such that the optical axis can be located. As disclosed elsewhere herein, the location of the lens system may be adjusted in the X and Y directions and its orientation may be adjusted about the X and Y-axis. The process of locating the optical axis may commence with the lens system being adjusted in one direction of the four possible adjustments (translation in the +/−X direction, translation in the +/−Y direction, rotation about the X-axis and rotation about the Y-axis). An image of the spots as a result of the adjustment is again obtained and a determination is made on whether spot 40 is now closer to spot 38 than it was in the last image by determining the distance between the two spots 38, 40. If spot 38 gets closer to spot 40, continue making the same small adjustments and obtaining verifications until the two spots 38, 40 start to depart from one another, at which point the incremental adjustments can be made in the opposite direction until no improvements have been observed. When an adjustment (translation or rotation) has failed to yield an improvement in the distance between the spots 38, 40, a different adjustment is attempted using the same procedure until the optical axis has been located, i.e., when the two spots become concentric. The same process can be applied to images obtained from a lens system with a low optical power lens as shown in test image 58 where the first test image obtained may already have the two spots 38, 40 partially overlapped. It shall be noted that, in test image 58, the two spots 38, 40 are partially overlapped but are not concentrically disposed. When this condition is first detected, it may be beneficial to rotate the lens system 2 about a Z-axis coincidental with the central axis of light beam 12 such that the reference spot 38 may be identified as the portion of the aggregate area of the spots 38, 40 that stays stationary and the result of an adjustment can be confirmed more readily, i.e., whether spot 40 approaches the center of spot 38 as a result of the adjustment. Another confirmation that an adjustment is bringing the position and/or orientation of the lens system closer can be demonstrated by the decreasing aggregate area of the two spots 38, 40. When the optical axis of the lens system becomes fully aligned with the light beam 12, the minimum aggregate area of the spots 38, 40 is observed as the two spots 38, 40 now fully overlap one another.

Figure 14:
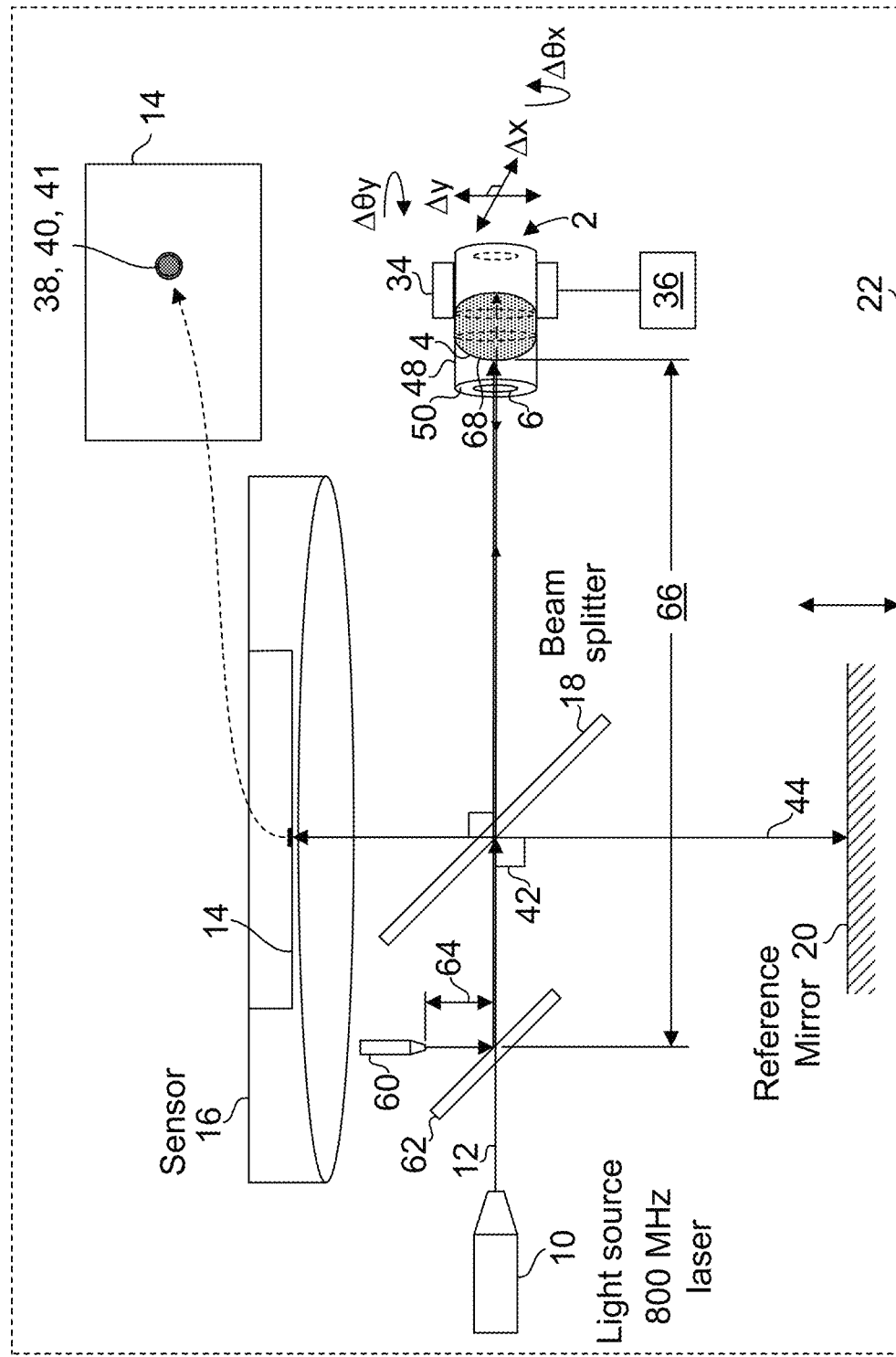
FIG. 14 is a diagram depicting a sensor useful for detecting the pupil center of a lens system.

FIG. 14 is a diagram depicting a sensor 60 useful for detecting the pupil center of a lens system. The sensor 60 can be an optical-based distance sensor, e.g., a depth sensor or a confocal sensor, useful for obtaining its distance to an object as long as the transmittance of sensing signals between the sensor 60 and the object is not blocked. A depth sensor operates on the principle of time-of-flight (ToF) or the time it takes for a light pulse, e.g., infrared (IR), to travel to an object and back to the sensor. In order to coincide with the path of light beam 12, a second beam splitter 62 is used to redirect the sensing signals from the sensor 60 along the path of light beam 12. It shall be noted that sensing signals are shown disposed at a slight offset from the path of light beam 12 although the sensing signals traverse along the same path as light beam 12, in an effort to demonstrate the traversal of the sensing signals. As the sensor 60 is disposed at a known location and a fixed closest distance 64 between the sensor 60 and the light beam 12, the exact location of the pupil center 68 can be resolved once the sensor 60 returns a measured distance as it is an aggregate of the fixed closest distance 64 and the distance 66 between the second beam splitter 62 and the pupil center 68.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An apparatus for indicating a misalignment of an optical axis of a lens system having at least one lens, a front end and a rear end, the at least one lens having a front surface and a rear surface, said apparatus comprising:
   (a) a light source;
   (b) a first mirror;
   (c) a first beam splitter;
   (d) an image sensor;
   (e) a motion stage configured for receiving the lens system; and
   (f) a controller,
   wherein a laser beam of said light source is configured to be directed at said first beam splitter to result in a first beam and a second beam, said first beam is redirected at said first mirror before being redirected by said first mirror through said first beam splitter to cast a first spot at said image sensor, and said second beam is disposed through said first beam splitter to be directed at the front surface of the lens system before being reflected back by the lens system and redirected by said first beam splitter to cast at least one second spot at said image sensor, said controller is configured to determine if said at least one second spot and said said first spot are concentrically disposed, if said at least one second spot and said first spot are not concentrically disposed, a misalignment of an optical axis of the lens system with said laser beam is said to have occurred and said controller is further configured to control said motion stage until said at least one second spot and said first spot are concentrically disposed.

2. The apparatus of claim 1, wherein at least one of the at least one lens of the lens system is a lens with an anti-reflective coating disposed on the front surface of the at least one lens and said light source is an 800-MHz laser beam light source to allow said at least one second spot to be cast on the image sensor.

3. The apparatus of claim 1, further comprising a second mirror disposed at the rear end of the lens system, said second mirror configured to reflect remnants of said second beam exiting the rear end of the lens system back into the lens system before being redirected by said first beam splitter to form a part of said at least one second spot.

4. The apparatus of claim 1, wherein the at least one lens of the lens system is at least two lenses.

5. The apparatus of claim 1, wherein said motion stage is further configured to be rotatable about an axis parallel to the laser beam.

6. An apparatus for detecting an optical axis and a pupil center of a lens system, the lens system having at least one lens, a front end and a rear end, the at least one lens having a front surface and a rear surface, said apparatus comprising:
   (a) a light source;
   (b) a first mirror;
   (c) a first beam splitter;
   (d) a second beam splitter configured to be disposed between said light source and the lens system;
   (e) a distance sensor configured to communicate sensing signals between said distance sensor and the first lens of the at least one lens through said second beam splitter and said first beam splitter;
   (f) an image sensor;
   (g) a motion stage configured for receiving the lens system; and
   (h) a controller,
   wherein a laser beam of said light source is configured to be directed at said first beam splitter to result in a first beam and a second beam, said first beam is redirected at said first mirror before being redirected by said first mirror through said first beam splitter to cast a first spot at said image sensor, and said second beam is disposed through said first beam splitter to be directed at the front surface of the lens system before being reflected back by the lens system and redirected by said first beam splitter to cast at least one second spot at said image sensor, said controller is configured to determine if said at least one second spot and said first spot are concentrically disposed, if said at least one second spot and said first spot are not concentrically disposed, a misalignment of an optical axis of the lens system with said laser beam is said to have occurred, said controller is further configured to control said motion stage such that at least one of a positional and an orientational adjustment of the lens system is made to dispose the lens system in a position and an orientation in which said at least one second spot and said first spot are concentrically disposed and said distance sensor returns a distance to the first lens of the at least one lens, indicating the location of the pupil center.

7. The apparatus of claim 6, wherein said distance sensor is a sensor selected from the group consisting of a depth sensor and a confocal sensor.

8. The apparatus of claim 6, wherein at least one of the at least one lens of the lens system is a lens with an anti-reflective coating disposed on the front surface of the at least one lens and said light source is an 800-MHz laser beam light source to allow said at least one second spot to be cast on the image sensor.

9. The apparatus of claim 6, further comprising a second mirror disposed at the rear end of the lens system, said second mirror configured to reflect remnants of said second beam exiting the rear end of the lens system back into the lens system before being redirected by said first beam splitter to form a part of said at least one second spot.

10. The apparatus of claim 6, wherein the at least one lens of the lens system is at least two lenses.

11. The apparatus of claim 6, wherein said motion stage is configured to be rotatable about an axis parallel to the laser beam.

* * * * *